(No Model.) 2 Sheets—Sheet 1.
D. C. STOVER & O. J. ZIEGLER.
WINDMILL REGULATOR.
No. 447,139. Patented Feb. 24, 1891.
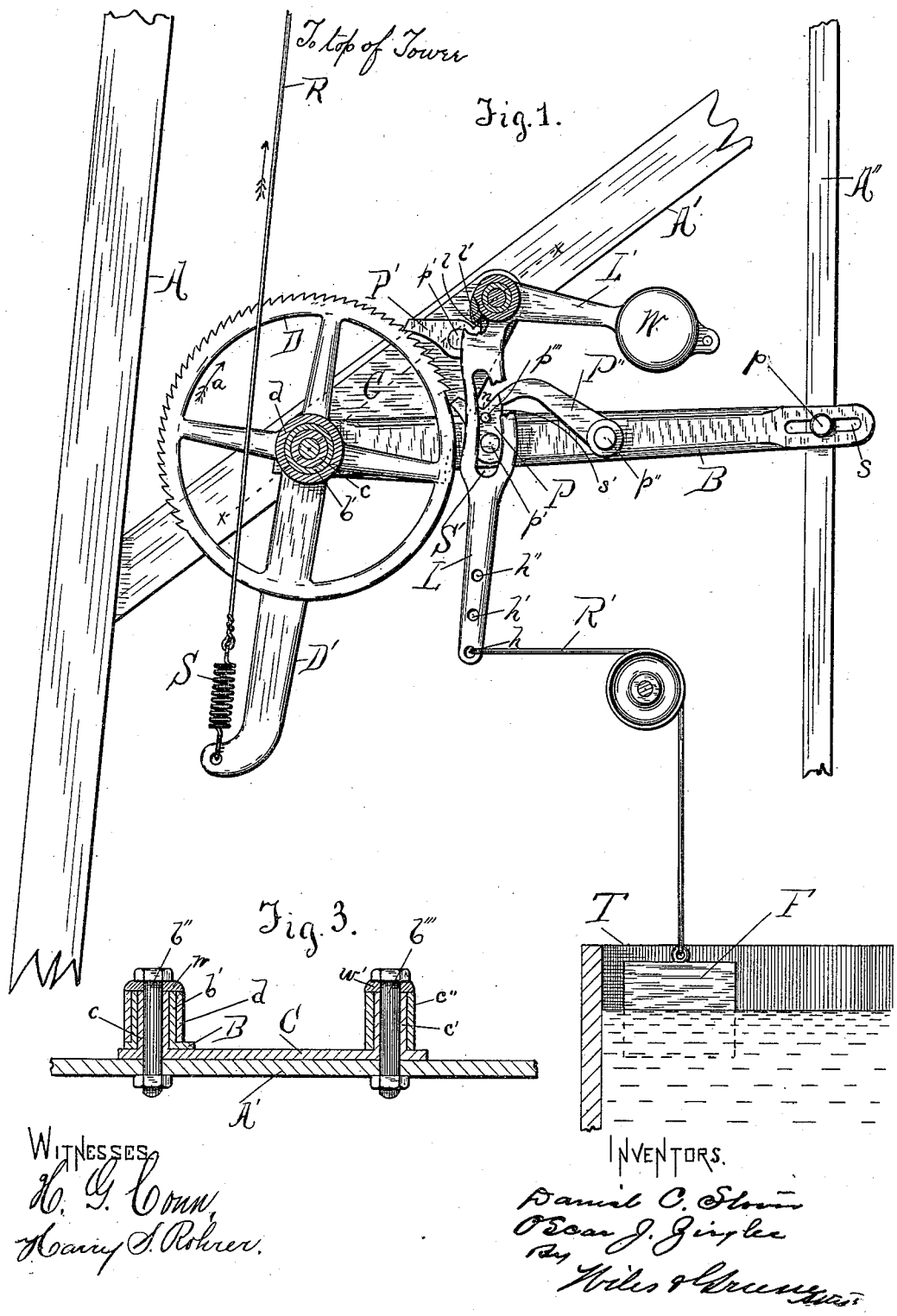

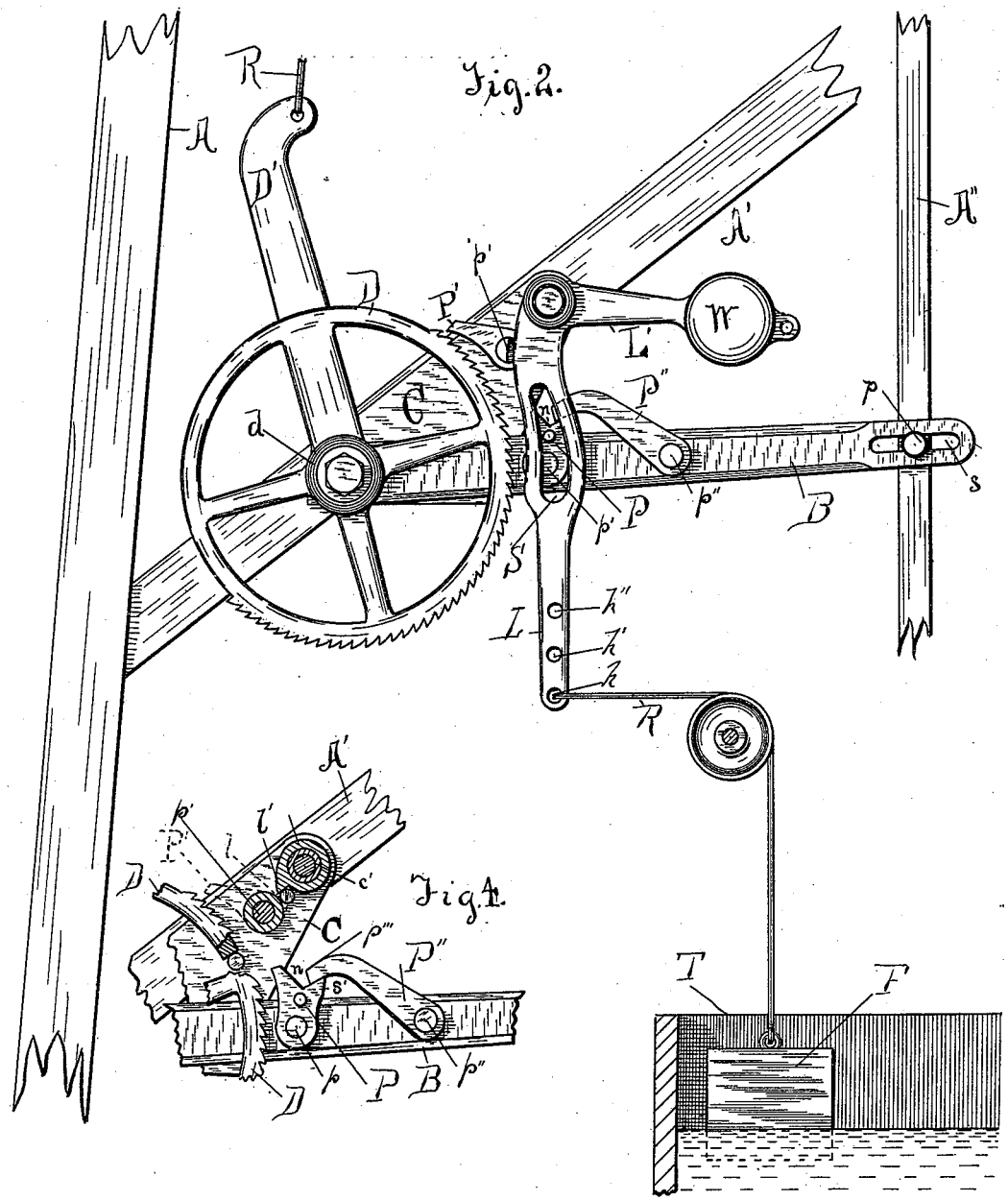

UNITED STATES PATENT OFFICE.

DANIEL C. STOVER AND OSCAR J. ZIEGLER, OF FREEPORT, ILLINOIS.

WINDMILL-REGULATOR.

SPECIFICATION forming part of Letters Patent No. 447,139, dated February 24, 1891.

Application filed June 11, 1890. Serial No. 355,041. (No model.)

*To all whom it may concern:*

Be it known that we, DANIEL C. STOVER and OSCAR J. ZIEGLER, residents of Freeport, in the county of Stephenson and State of Illinois, have invented certain new and useful Improvements in Windmill-Regulators; and we do hereby declare the following to be a full, clear, and exact description of the invention, such as will enable others skilled in the art to which it pertains to make and use the same.

Our invention relates to improvements in windmill-regulators adapted for use in pumping-mills, the object of the invention being to provide a simple and practical means whereby the operation of the windmill may be governed by the stage of water in the tank supplied by the mill, the mill being thrown into the wind when the water in the tank is lowered to a certain limit and thrown out of the wind when the water rises to a certain limit.

The invention is fully described and explained in this specification, and shown in the accompanying drawings, in which—

Figure 1 is a front elevation of our improved regulator, the parts being in that position which they assume in throwing the windmill out of the wind and which they maintain while the wheel remains out of the wind. Fig. 2 is a front elevation of the device, the parts being in the position in which they remain while the wind-wheel is in the wind and the pump is operating; and Figs. 3 and 4 are views illustrating details of construction.

In the views, A is one of the posts of an ordinary windmill-tower, A' an oblique brace forming part of the tower, and A'' the pump-rod connected above with the crank-pin of a windmill of any ordinary construction and below with a pump of any desired form.

B is an approximately horizontal lever connected at one end with the pump-rod by means of a pin $p$, set in the pump-rod and passing through a slot $s$ in the lever, the opposite end of the lever being pivoted to a plate C, fastened permanently to the brace A' or any other stationary support.

A wheel D, of any desired construction, formed with ratchet-teeth extending through about one-half of its margin, is connected to the plate C by a pivot concentric with that which connects the lever B with the plate, the arrangement of the parts by which the plate, the lever, and the wheel are thus pivoted together being preferably that illustrated in Fig. 3, in which the plate C is provided with an integrally-formed sleeve $c$, the lever B being provided with a second sleeve $b'$, which encircles the sleeve $c$, and the wheel being provided with a hub $d$, encircling the sleeve $b'$, the parts being all held together and fastened to the stationary support A' by means of a cap or washer $w$ and a bolt $b''$, passing through the washer and through the sleeve $c$. The wheel D is provided with an arm D', extending outward from the wheel-rim, and a cord or rope R extends from the free end of the arm to the top of the tower, where it is so connected with the mechanism of the mill that sufficient downward strain upon the cord throws the windmill out of the wind and stops its operation in the manner common and well known in the art of windmill construction. A spring S is interposed between the cord R and the end of the arm D' and takes up any shock which the parts might sustain in the operation of the device and in the sudden release of the wind-wheel from its inoperative position in the manner hereinafter set forth.

A pawl P is pivoted to the lever B by means of the pin $p'$ in such a position that its point may engage the ratchet-teeth on the periphery of the wheel D, and a second pawl P' is pivoted to the plate C by means of the pin $p'$, the position of this second pawl being also such that it may engage the teeth of the wheel. The point of the pawl P is above its pivot $p$, and at the upper end of the pawl on the margin opposite to the point thereof is formed a spur $s'$, separated from the point by a depression or notch $n$. A third pawl P'' is pivoted to the lever B by means of the pivot $p''$, and the point of this pawl rests against the spur $s'$ and holds the point of the pawl P in contact with the periphery of the wheel D when all the parts are in the position shown in Fig. 1, and in fact at all times when the point of the pawl P is not withdrawn from the margin of the wheel by the means hereinafter described.

A bell-crank lever made up of the vertical member L and horizontal member L' is pivoted to the plate C in the manner illustrated in Fig. 3, in which c' is a sleeve formed on the plate C, c'' is a second sleeve formed on the lever and encircling the sleeve c', and w' is a washer or cap covering the ends of the two sleeves and held in place by a bolt b'''. The free end of the horizontal member of the lever L L' is provided with a weight W, which tends to swing the free end of the vertical member toward the wheel D, and the free end of the vertical member is provided with a rope or cord R', which passes over a pulley to a float F, resting on the water in a tank T of any desired construction. A slot S' is formed in the vertical member L, and a pin p''', set in the pawl P near its upper end, lies in the slot and is about midway between the side walls thereof when the parts are in the position shown in Fig. 1. A lug l, formed on the rear end of the pawl P', engages a similar lug l', formed on the inner face of the bell-crank lever near the point at which the same is pivoted to the plate C, the two lugs l l' being so placed as to be slightly separated when all the parts are in the position shown in Fig. 1 and the point of the pawl P' is in engagement with the teeth of the wheel D. As has already been said, Fig. 1 shows the regulator in the position which it maintains when the wind-wheel is out of the wind, the arm D' of the wheel being in its lowest position and the wind-wheel being held out of the wind by the cord R, which is stretched taut between the end of the arm and the movable element of the mill above. The cord R', which extends from the free end of the lever-arm L to the float F, is also drawn taut, the free end of the lever-arm being thrown toward the wheel D by the weight W. If now the water in the tank T be lowered, the float F sinks with it, and the free end of the lever-arm L is gradually drawn away from the wheel D. When the lever-arm L has thus been swung to a very slight angle, the left-hand wall of the slot S' in the lever-arm L strikes the pin p''' of the pawl P, and the continuation of the movement throws the point of the pawl P completely out of range of the ratchet-teeth of the wheel D. As this disengagement of the pawl P progresses, the point of the pawl P' is also moved out of engagement with the teeth of the wheel through the operation of the lug l' upon the lug l of the last-named pawl; but the arrangement of the parts is such that the point of the pawl P is thrown completely out of range of the teeth of the wheel D before the point of the pawl P' is disengaged therefrom. Thus when the teeth of the wheel D are free from the pawl P' the wheel is free to turn in the direction indicated by the arrow a, Fig. 1, without any possibility of the ratchet-teeth striking the point of the pawl P. The downward movement of the float and the movement of the free end of the lever-arm L away from the wheel D continues until the parts reach the position shown in Fig. 2, when both the pawls are entirely free from the wheel D, and the arm D' of the wheel is in its highest position, it having been drawn upward by the swinging of the wind-wheel into the wind upon the release of the pawls from the wheel. As the parts approach this position the movement of the point of the pawl P away from the wheel D presses the spur s' against the point of the pawl P'' and raises it, permitting it to drop into the notch n, already referred to, and form a slight friction-lock to hold the pawl P in the position shown in Fig. 2 until it is forced from there in the manner hereinafter set forth. As soon as the wind-wheel is thrown into the wind by the release of the wheel D from the position shown in Fig. 1 it is in position to pump, and when operated upon by sufficient wind-power will begin filling the tank and continue to do so until the rise of the float F permits the free end of the lever-arm L to approach the wheel D until it reaches the position shown in Fig. 1. In the approach of the arm to this position the right-hand wall of the slot S' strikes the pin p''' and forces the upper end of the pawl P toward the wheel D, the point of the pawl P'' being thus freed from the notch n and permitted to drop down behind the spur s', as shown in Fig. 1. At the same time the movement of the lug l' permits the pawl P' to drop into engagement with the teeth of the wheel, and the engagement of the two pawls P P' with the wheel is thus completed. The pawls being thus in engagement with the teeth of the wheel, it is evident that each upward stroke of the pump rod and lever B must operate through the pawl P to rotate the wheel in the direction opposite to that indicated by the arrow a, Fig. 1, and that at each downstroke of the lever the pawl P will drop downward, the wheel in the meantime being secured by the pawl P', which thus stores up the motion imparted to the wheel by the pawl P. As the wheel is thus rotated by the lever B and pawl P, the free end of the arm D' swings downward, gradually drawing the wind-wheel out of the wind, the wheel thus supplying power for throwing itself out of operative position. The rotation of the wheel continues until it is completely out of the wind and inoperative when the pumping ceases and the parts are left in the position shown in Fig. 1, where they remain until the fall of the water-level in the tank again disconnects the pawls P P' from the wheel D and brings the windmill into operative position.

The slot S' in the lever-arm L is approximately an arc of a circle, and when the lever is in the position shown in Fig. 2 this arc is practically concentric with the center of the wheel D, which is the point of pivotal connection of the lever B with the stationary plate C. This being the case, the pin p''' moves up and down with a lever B without striking or working on the walls of the slot. The pivot $p$ of the pawl P may be in any operative position with reference to the center of gravity of the pawl; but as we have constructed the device the pivot is so placed that the center of gravity of the pawl is on one side of the vertical line of the pivot when the pawl is in engagement with the ratchet-teeth and on the opposite side of said line when the pawl is out of such engagement. The result is that before the point of the pawl comes into engagement with the points of the ratchet-wheel it falls toward the wheel and comes instantly into full engagement, being thus secured against any possibility of raking the points of the teeth.

Having now described and explained my invention, what I claim as new, and desire to secure by Letters Patent, is—

1. In a regulator of the class described, the combination, with the ratchet-wheel and means for connecting it with the working parts of a windmill, of a lever adapted to be connected with the pump-rod of the mill, a pawl pivoted to said lever and adapted to engage the teeth of the ratchet-wheel and to transmit the motion of the lever to the wheel, a second pawl pivoted to a stationary support and adapted to engage the teeth of the ratchet-wheel, a swinging lever, and means for connecting the free end of the lever with a tank-float, whereby the lowering of the float may operate and swing the lever, drawing both of said pawls out of engagement with the teeth of the ratchet-wheel, the pawl upon the operating-lever being drawn out of such engagement in advance of the pawl pivoted to the stationary support, substantially as and for the purpose set forth.

2. In a regulator of the class described, the combination, with a ratchet-wheel provided with a projecting arm and means for connecting the free end of said arm with the working parts of a windmill, of an operating-lever adapted to be connected with the pump-rod of the mill, a pawl pivoted to said lever and a pawl pivoted to a stationary support, both adapted to engage said ratchet-wheel, a bell-crank lever adapted to engage directly both of said pawls and having one of its arms weighted, whereby it tends normally to preserve the engagement of said pawls with said ratchet-wheel, and means for connecting the other member of the lever with a tank-float, whereby the lowering of the float may operate said bell-crank lever to draw both of said pawls out of engagement with the ratchet-wheel, the pawl pivoted upon the operating-lever being so withdrawn in advance of the other, substantially as and for the purpose set forth.

3. The combination, with the ratchet-wheel D, of the operating-lever B, the pawls P P', adapted to engage said ratchet-wheel, the weighted bell-crank lever L L', formed with the slots S', adapted to engage a pin on the pawl P, and means for connecting the free end of the member L of the lever with the tank-float, whereby the lowering of the float may withdraw the free end of the lever from the ratchet-wheel B and thereby draw the pawl P out of engagement with the wheel, substantially as and for the purpose set forth.

4. The combination, with the lever B, ratchet-wheel D, and pawls P P', of the bell-crank lever L L', slotted to receive the pin $p'''$ on the pawl P and provided with the lug $l'$, engaging a lug $l$ on the pawl P', whereby the movement of the free end of the lever-arm L away from the wheel D may withdraw first the pawl P and then the pawl P' from engagement with the wheel, substantially as and for the purpose set forth.

5. The combination, with the wheel D, lever B, and pawl P', of the pawl P, pivoted to the lever B and provided with the spur $s'$ and notch $n$, the pawl P'', also pivoted to the lever B and adapted to co-operate with the pawl P, substantially as and for the purpose set forth, and the bell-crank lever L L', slotted to engage the pin $p'''$ and provided with a lug engaging a coacting lug of the pawl P', whereby a movement of the free end of the lever-arm L away from the wheel D may disengage first the pawl P and then the pawl P' from the ratchet-wheel, and the pawl P'' may engage the notch $n$ in the pawl P and hold said pawl out of engagement with the ratchet-wheel, substantially as and for the purpose set forth.

6. The combination, with the ratchet-wheel, the lever B, and the lever L, of the pawl P, pivoted to the lever B and operated by the lever L, the pivot of the pawl being below the center of gravity thereof and in a vertical plane lying between the limits of motion of the free end of the pawl.

In testimony whereof we have signed this specification in the presence of two subscribing witnesses.

DANIEL C. STOVER.
OSCAR J. ZIEGLER.

Witnesses:
L. HUGHES,
C. A. BEST.